United States Patent [19]
Nakamura et al.

[11] Patent Number: 5,570,980
[45] Date of Patent: Nov. 5, 1996

[54] SPINDLE APPARATUS

[75] Inventors: Shinya Nakamura; Kiyoharu Maruta; Masaki Matsuoka, all of Maebashi; Koji Nishii, Nara-ken, all of Japan

[73] Assignees: NSK Ltd, Tokyo; Asuka Trading Co., Ltd., Nara-ken, both of Japan

[21] Appl. No.: 356,677

[22] Filed: Dec. 15, 1994

[30]  Foreign Application Priority Data

Dec. 21, 1993 [JP] Japan ................................. 5-322779

[51] Int. Cl.$^6$ .............................. B23C 9/00; B23B 47/00
[52] U.S. Cl. ....................................... 409/232; 408/239 R
[58] Field of Search ................................. 409/231, 232, 409/234, 233; 483/13; 408/239 R, 238, 239 A; 82/158, 160; 279/900, 4.06

[56]  References Cited

U.S. PATENT DOCUMENTS

| | | | |
|---|---|---|---|
| 4,840,520 | 6/1989 | Pfalzgraf | 409/232 |
| 5,002,442 | 3/1991 | Rutschle | 409/134 |
| 5,382,073 | 10/1994 | Kitaguchi | 409/232 |

FOREIGN PATENT DOCUMENTS 6-312305  11/1984  Japan.

*Primary Examiner*—William R. Briggs
*Attorney, Agent, or Firm*—Shapiro and Shapiro

[57]  ABSTRACT

A spindle apparatus capable of exhibiting a good interchangeability of a tool holder without any necessity for managing a gap between an end surface of the tool holder and an end surface of a spindle shaft and, besides, obtaining a high tool holding rigidity. Small- and large-diameter portions are formed in the outer surface of the spindle shaft having a taper hole formed in the shaft end. A sleeve formed with a fluid passageway communicating with the outside is fitted, with interferences, to the outer surface thereof. On the other hand, a flange having a diameter larger than a taper shank is provided at a proximal portion of the taper shank of the tool holder. A fluid pressure is applied to the fluid passageway of the sleeve, thereby making the sleeve contact with the flange of the tool holder that is fitted to the spindle shaft. Thereafter, the sleeve is fixed to the spindle shaft by removing the fluid pressure, and the tool holder is supported with a high rigidity.

2 Claims, 4 Drawing Sheets

५,५७०,९८०

SPINDLE APPARATUS

BACKGROUND OF THE INVENTION

1. Field of the Invention

The present invention relates generally to a spindle apparatus of a machine tool and, more particularly, to an improvement of a tool mountability in a tool mounting unit.

2. Related Background Art

In a machine tool in a machining center (MC) equipped with, e.g., an automatic tool changer (ATC), as illustrated in FIG. 6, a taper hole 2 for mounting a tool is formed in a front end of a spindle shaft 1. A taper shank portion 4 of a tool holder 3 is fitted into this taper hole 2, thereby mounting a predetermined tool. This type of taper shank portion 4 is classified into a BT type having a long taper prescribed by Japanese Industrial Standards (JIS) and a short taper type prescribed by German Industrial Standards (DIN). FIG. 6 shows an example of the BT type. Only at this type of taper shank portion 4, the tool holder 3 is supported on the spindle shaft 1, and it can not be said that the rigidity is so high. The entire surface of the taper hole 2 is not in well-contact with the entire surface of the taper shank portion 4, and, therefore, heavy cutting is hard to perform. Further, there appears such a phenomenon that a well-cut surface is hard to obtain in the case of finishing cutting.

In recent years, however, a new type of spindle apparatus as illustrated in FIG. 7 has come to be proposed in order to obviate such problems. With respect to the hold of the tool holder 3, this spindle apparatus takes a taper/end surface double-contact method of providing not only a contact between the taper shank portion 4 and the taper hole 2 but also a contact between an end surface 3a of the tool holder 3 and an end surface 1a of the spindle shaft 1.

In the case of the spindle shaft according to the above taper/end surface double-contact method, however, it is quite, as a matter of fact, difficult to simultaneously make the taper surface contact with the shaft end surface intersecting this taper surface. In this case, for ensuring an effective tool holding force, in a state where the taper hole 2 is brought into contact with the taper shank portion 4, further, a pre-load has to be given by making negative a magnitude of a gap δ between the end surface 3a of the tool holder 3 and the end surface 1a of the spindle shaft 1. Besides, the contact between the tapers has to be managed within a highly strict range where the magnitude thereof is on the order of 2 μm. However, the tool holder 3 is replaced every time the type of the tool differs, and, hence, a multiplicity of tool holders 3 are required to be used. It is quite difficult to strictly manage the gap from the spindle shaft 1 with respect to all kinds of those toll holders 3. Consequently, there still exists a problem remaining unsolved, wherein an interchangeability of the tool holder 3 is not improved.

SUMMARY OF THE INVENTION

It is an object of the present invention, which was devised in view of such problems inherent in the prior arts, to provide a spindle apparatus capable of eliminating a necessity for managing a gap between an end surface of a tool holder and an end surface of a spindle shaft, therefore obviating any problem in terms of an interchangeability of the tool holder and, besides, obtaining a high holding rigidity.

To accomplish the above object, according to one aspect of the present invention, there is provided a spindle apparatus comprising: a spindle shaft having a tool mounting taper hole formed in a shaft end portion and formed with a small-diameter portion and a large-diameter portion in an outer peripheral surface of the shaft end portion; a tool holder having a taper shank portion fitted into the taper hole of the spindle shaft and a flange having a larger diameter than the taper shank portion; and a sleeve fitted, with respective interferences, into the small-diameter portion and the large-diameter portion of the spindle shaft and, at the same time, formed with a fluid passageway communicating with the outside at a connecting portion between the small-diameter portion and the large-diameter portion, wherein a fluid pressure is applied to the fluid passageway of the sleeve, and the sleeve is thereby brought into contact with the flange of the tool holder that is fitted to the spindle shaft, the sleeve is then fixed to the spindle shaft by removing the fluid pressure, thus supporting said tool holder in a predetermined position.

In a state where the taper shank portion is fitted into and thus contacts the taper hole of the spindle shaft, there is formed a gap between the shaft end surface of the spindle shaft and the end surface of the tool holder. However, the flange having a diameter larger than the taper shank portion of the tool holder is always, with a predetermined pressing force, brought into contact with the end surface of the sleeve fastened and fixed, with interferences, to the spindle shaft. Accordingly, the support rigidity of the tool holder can be increased, and, besides, the support thereof is stable. In such a stable support of the tool holder, when applying a fluid pressure to the fluid passageway of the stepped sleeve fitted to the spindle shaft, an internal pressure acts on the inner peripheral surface of the sleeve, with the result that inside and outside diameters of the sleeve are expanded, and the interferences of the shaft end portion are opened. Simultaneously, the internal pressure also acts on the stepped portion of the inside-diameter surface of the sleeve, thereby thrusting the sleeve out. The end surface thereof is pressed with a predetermined pressing force against the flange surface of the tool holder and then comes into contact therewith. Next, when removing the fluid pressure, the internal pressure is also removed, with the result that the expanded sleeve inside- and outside-diameter surfaces return to the original state and fastened and then fixed to the spindle shaft end portion.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENT

Embodiment of the present invention will hereinafter be discussed with reference to the drawings. Note that the same or corresponding portions as or to those in the prior art are marked with the like symbols.

Figure 1:
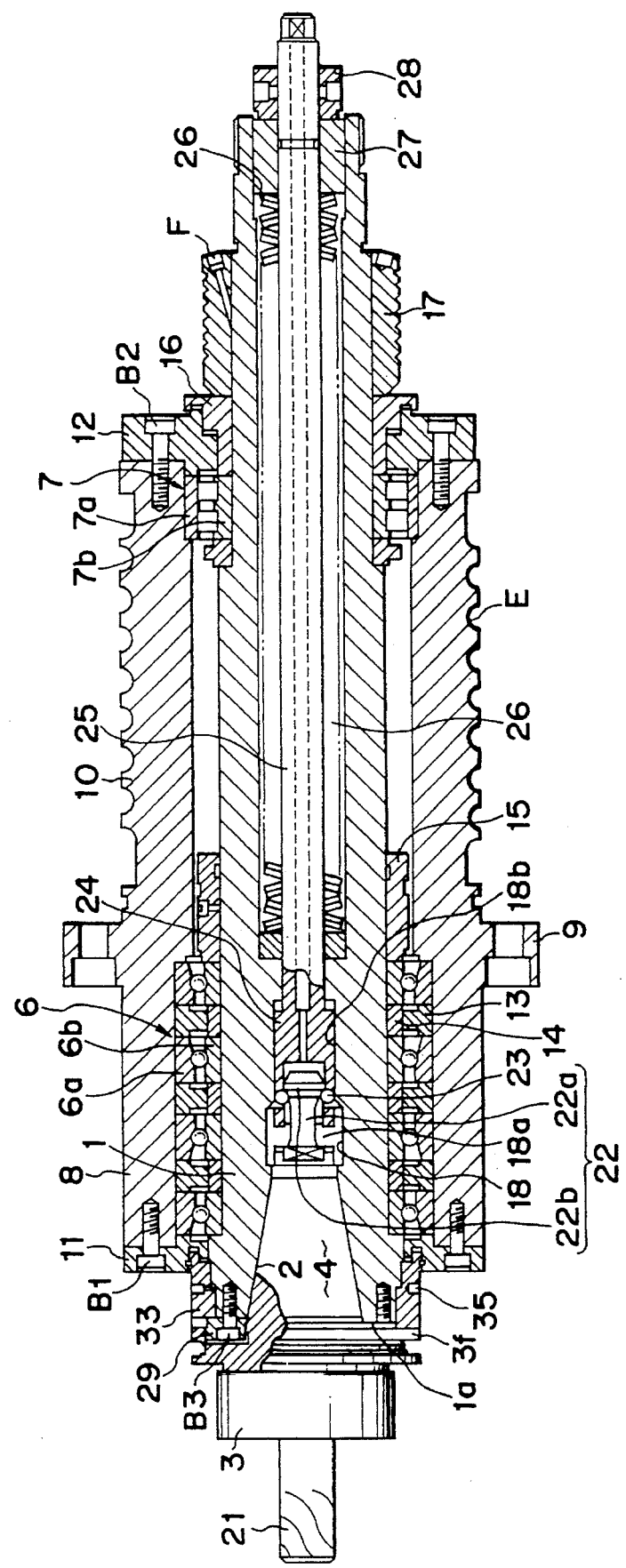
FIG. 1 is a vertical sectional view illustrating one embodiment of a spindle apparatus according to the present invention.

The discussion will start with touching on a construction. FIG. 1 is a vertical sectional view illustrating one embodiment of this invention. A spindle shaft 1 of a spindle apparatus is rotatably horizontally supported within a housing 8 through a plurality (four pieces in the Figure) of ball bearings and a single piece of roller bearing. The housing 8 comprises an external cylinder 10 defined as a cylindrical body surrounding the outer peripheries of the bearings 6, 7 and having a mounting flange 9 formed on an external surface thereof. The housing 8 also comprises a front cover 11 fixed to a front end surface of this external cylinder 10 with a bolt B1 and a rear cover 12 fixed to a rear end surface thereof with a bolt B2.

When mounting the spindle apparatus into a bore of a spindle mounting board of a machine tool, a helical passageway E is formed between the internal surface of the bore and the external cylinder 10. This helical passageway E serves to cool off the spindle apparatus by flowing a cooling fluid therealong.

By the front cover 11, outer rings 6a of the plurality of ball bearings 6 are fixed to the internal surface of the housing 8 through outer spacers 13. Inner rings of the ball bearings 6 are fixed to the outer peripheral surface of the spindle shaft 1 by presser rings 15 through inner spacers 14. On the other hand, by the rear cover 12, an outer ring 7a of the roller bearing 7 is fixed to the internal surface of the housing 8. An inner ring 7b of the roller bearing 7 is fixed to the outer peripheral surface of the spindle shaft 1 by a pulley 17 contacting a ring-like inner ring presser cover 16 through this inner ring presser cover 16. The pulley 17 is so mounted as to be interference-fitted to the outer peripheral surface of the spindle shaft 1. Designated by F is a fluid pressure supply port through which a pressure is applied on a fitting surface when attaching or detaching the pulley 17.

A taper hole 2 for mounting the tool is formed at the center of a shaft end portion of the thus rotatably supported spindle shaft 1, and a through-hole 18 penetrating a rear end portion of the spindle shaft from an inner part of this taper hole 2 is formed along the shaft central portion of the spindle shaft 1. A tool attaching/detaching mechanism which will be stated as below is provided into this through-hole 18.

Fitted into the taper hole 2 is a taper shank portion 4 of a tool holder 3 for holding a tool 21. The tool holder 3 includes a flange portion 3f having a larger diameter than the taper shank portion and provided at a proximal part of the taper shank portion 4. Further, a pull stud consisting of a small-diameter neck 22a and a large-diameter head 22b is provided on the apex of the taper shank portion 4 and is fitted into the through-hole 18 formed in the center of the spindle shaft.

The above tool attaching/detaching mechanism has a sleeve 24, which holds a plurality of balls 23 retreatably in the radial direction. The balls are equally disposed along the circumference and for holding the pull stud 22 of the tool holder 3 that is fitted into the through-hole 18. A drive draw bar 25 for driving this sleeve back and forth passes through the through-hole 18, and its rear end is protruded from the spindle shaft 1. The rear end of the draw bar 25 is thrust-driven by an unillustrated piston. Then, the draw bar 25 is, when released from the thrust by the piston, moved back by belleville springs 26, and, therefore, the sleeve 24 is also moved back. At this time, the balls move from a space 18a having a relatively large diameter to a space 18b having a relative small diameter of the through-hole 18 and are, meanwhile, pushed by a hole inner peripheral surface. Then, the balls 23 are protruded on the side of the inside diameter portion of the sleeve 24 and engage with the head 22b of the pull stud 22 of the tool holder 3. Further, when the sleeve 24 is moved forward by driving the piston, the balls 23 move into the large-diameter space 18a of the through-hole 18 and are retreatable because of an expansion of the inside diameter, whereby the balls 23 are retracted outward in the radial direction from the inside-diameter surface of the sleeve 24. The tool holder 3 can be thereby pulled out. The multiplicity of belleville springs 26 are attached onto the outer peripheral portion of the draw bar 25 existing in the interior of the through-hole 18, with the result that the draw bar 25 is always strongly biased in the rear-end direction. Note that the numeral 27 designates a presser ring for the belleville spring 26; 28 represents a fastening nut for fixing the presser ring 27 to the spindle shaft 1; and 29 denotes a drive key, fixedly attached to a spindle shaft end surface 1a, for positioning the tool holder 3 and the spindle shaft 1 in the rotating direction.

Figure 2:
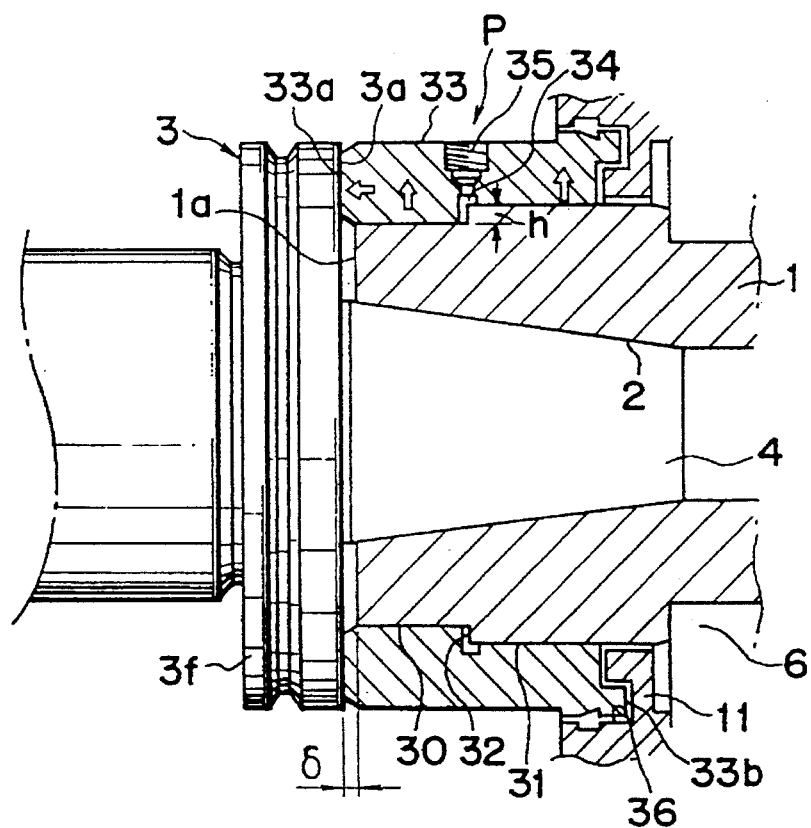
FIG. 2 is an enlarged view of a tool mounting portion in FIG. 1 but a key in FIG. 1 is omitted in FIG. 2.

As illustrated in enlargement in FIG. 2 in which the key 29 in FIG. 1 is omitted, the outer peripheral surface of the shaft end portion (on the side of having the taper hole 2) of the spindle shaft 1 has a small diameter, and a stepped portion 32 having a height h is formed at a connecting portion between this small-diameter portion 30 and a large-diameter portion 31 subsequent thereto. Then, a sleeve 33 (hereinafter termed a fixation sleeve) having interferences respectively for the small-diameter portion 30 and the large-diameter portion 31 of the spindle shaft is fitted to the outer peripheral surface of the shaft end portion of the spindle shaft 1. The relevant interferences of the fixation sleeve 33 serve to hold the fixation sleeve 33 fitted to the end portion of the spindle shaft 1 by firmly fastening the fixation sleeve 33. Each of these interferences is required to have a size enough to make a force for supporting the tool holder 3 resistible against a force applied during working but is empirically determined.

A fluid passageway 34 composed of an annular recessed portion is formed in a position of the stepped portion 32 of the outer surface of the spindle shaft in the inner peripheral surface of the fixation sleeve 33. This fluid passageway 34 communicates with the outside via a connecting portion 35 of a fluid pressure supply pipeline. Further, a front end surface 33a of the fixation sleeve 33 is protruded by a length δ (on the order of, e.g., 0.5–1 mm) from the shaft end surface 1a of the spindle shaft 1. On the other hand, a rear end surface 33b of the fixation sleeve 33 is formed in a rugged stepped configuration and in non-contact but face-to-face relationship with the front cover 11 of the housing 8 through a labyrinth-structured gap 36 for preventing foreign matters from entering.

Herein, the height h of the stepped portion 32 of the outer peripheral portion of the spindle shaft end portion is also a level difference of the inside diameter portion of the fixation sleeve 33. The height h functions such that the fixation sleeve 33 is moved forward with a fluid pressure by making use of this level difference and is brought into contact with the end surface of the tool holder 3 fitted to the spindle shaft 1. This sleeve advancing force is determined by a product of the fluid pressure and a magnitude of a difference between inside-diameter sectional areas of the fixation sleeve 33 in front and in rear of the stepped portion 32. The height h of the stepped portion is therefore determined in relation to a set value of the necessary fluid pressure.

Figure 3:
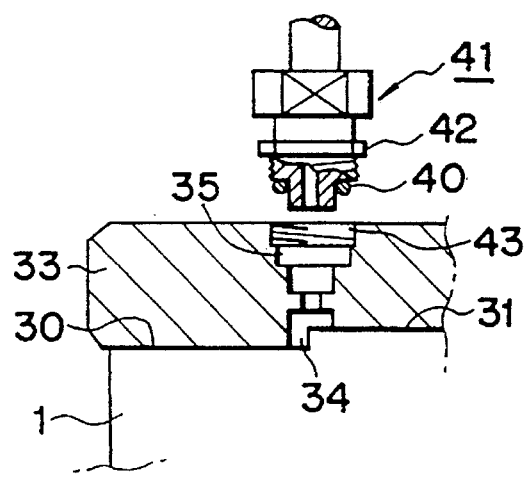
FIG. 3 is a sectional view of assistance in explaining one example of a fluid pressure supply pipeline connecting structure.

Note that the connecting portion 35 of the above fluid pressure supply pipeline is required to be structured so that a connection coupling 41 fitted with, e.g., a seal 40 as illustrated in FIG. 3 can be mounted with as less operations as possible and, besides, so as not to be removed by the fluid pressure. Specifically, the most typical structure is a straight screw structure as illustrated in FIGS. 1 and 2. It is, however, desirable that the apparatus for replacing the tool by the ATC has a coupling structure providing an automatically attachable/detachable state by substantially one-touch corresponding to a replacement speed thereof. In this case, the attaching/detaching mechanism is, it can be considered, constructed of, for instance, as shown in FIG. 3, a male thread 42 and a female thread 43 such as a rough trapezoidal or square thread fastened within a half-rotation. However, a known attaching/detaching mechanism other than the screw method may be employed.

The thus constructed spindle apparatus is mounted onto a spindle mounting machine board of the machine tool through the flange 9 of the housing 8. The pulley 17 of the rear end of the spindle shaft 1 is linked via a belt to a pulley of an output shaft of an unillustrated drive motor.

The operation for mounting or replacing a tool holder 3 will be next explained.

When the spindle shaft 1 has stopped rotating and the tool holder to be replaced has been removed, a connection coupling 41 of the pipeline extending from an unillustrated hydraulic supply device is connected to the pipeline connecting portion 35 of the fixation sleeve 33, and the draw bar 25 of the tool attaching/detaching mechanism is moved forward by driving the unillustrated piston, resisting the resiliency of the belleville springs 26. In this state, the taper shank portion 4 of the tool holder 3 carried by the ATC is inserted into the taper hole 2 of the spindle shaft 1. In either of cases where the flange of the tool holder 3 is brought into contact with the fixation sleeve 33 before the taper shank portion 4 of the tool holder 3 is fitted into the taper hole 2 of the spindle shaft 1, or where the taper shank portion 4 of the tool holder 3 is fitted into the taper hole 2 before the flange of the tool holder 3 is brought into contact with the fixation sleeve 33, an oil pressure P is supplied to the fluid passageway 34. The oil pressure causes a radial force to act on the inside-diameter surface of the fixation sleeve 33, with the result that the inside diameter of the fixation sleeve is expanded. The interferences with respect to the spindle shaft 1 of the fixation sleeve 33 are released. In the former case, the tool holder 3 which is further intruded into the taper hole 2, pushes the sleeve 33 backward, so that the taper shank portion 4 is fitted into the taper hole 2. In the latter case, a thrust-directional force according to a difference between the inside-diameter section areas acts on the stepped surface of the internal surface of the fixation sleeve 33 which corresponds to the stepped portion 32 of the outer surface of the spindle shaft, and the fixation sleeve 33 is thereby advanced. As a result of this advancement, the front end surface 33a of the fixation sleeve 33 is abutted with and is closely contacted to the end surface of the flange 3f of the tool holder 3. In this state, the tool holder 3 is further intruded thereinto. Then, the taper shank portion 4 of the tool holder 3 is fitted into the taper hole 2.

Then, the pull stud provided at the apex of the taper shank portion 4 is fitted into the sleeve 24 at the front end of the tool attaching/detaching mechanism. At this time, when releasing the drive of the unillustrated piston, the draw bar 25 moves back, and the sleeve 24 moves from the large-diameter space 18a to the small-diameter space 18b of the through-hole 18. At the same time, the balls 23 of the sleeve are pushed by the internal peripheral surface of the small-diameter space 18b and protruded on the inside of the sleeve 24. Subsequently, the tool holder 3 is held by pulling in the proximal portion of the head 22b of the pull stud 22 of the tool holder. The draw bar 25 is biased backward by the strong resiliency of the multiplicity of belleville springs 26, and hence the inclined surface of the taper shank portion 4 of the tool holder 3 is thereby pulled and closely fitted to the inner surface of the taper hole 2.

Thereafter, the fluid pressure is removed, and the fluid pressure applied on the inner surface of the fixation sleeve 33 is also removed, thereby reducing the inside diameter of the fixation sleeve 33 and fastening the outer surface of the spindle shaft 1. At this time, when changing a speed of removing the fluid pressure, it is possible to vary a force with which the fixation sleeve 33 presses the flange 3f of the tool holder 3. Hence, the speed of removing the fluid pressure is properly selected as empirically determined.

At this moment, the front end surface of the fixation sleeve 33 remains closely contacted to the end surface of the flange 3f of the tool holder 3, but the gap δ is formed between the end surface of the flange 3f and the shaft end surface 1a of the spindle shaft 1.

When detaching the tool holder 3 out of the spindle shaft 1, there is no necessity for applying the oil pressure, but, as usual, the draw bar 25 of the tool attaching/detaching mechanism is driven forward, thereby releasing the pull stud from being held by the balls 23 as well as releasing the engagement between the taper hole 2 and the taper shank portion 4.

Thus, in accordance with this embodiment, the tool holder 3 can be automatically mounted to the shaft end of the spindle shaft 1, and the tool holder 3 is capable of the stable holding with an extremely high rigidity by making the fixation sleeve surface double-contact with the taper surface. At the same time, the rigidity of the working such as cutting, etc., is also higher than by the conventional BT type tool holder, and high-load heavy working and precise finishing working can be performed with a simple structure. Besides, even when the gap δ on the order of 0.5–1 mm is formed between the mounting end surface of the flange of the tool holder 3 and the shaft end surface of the spindle shaft 1, the fixation sleeve 33 is fixed adjusted to the position of the flange of the tool holder 3. It is therefore feasible to sufficiently absorb a dimensional difference of the mounting portion of each of the multiple tool holders 3 and obviate the conventional problem in terms of the interchangeability of the tool.

Figure 5:
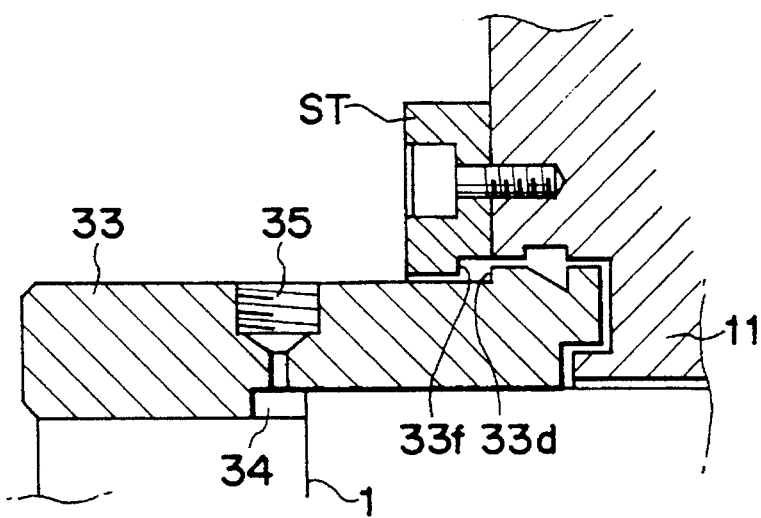
FIG. 5 is an enlarged view showing an example of modification of the tool mounting portion illustrated in FIG. 1.
Figure 6:
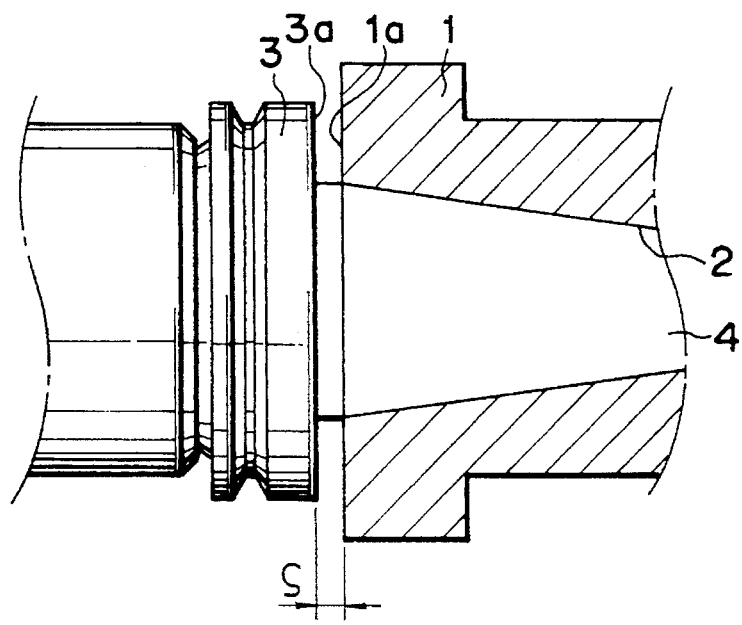
FIG. 6 is an enlarged view showing one example of a tool mounting portion in a conventional spindle apparatus.
Figure 7:
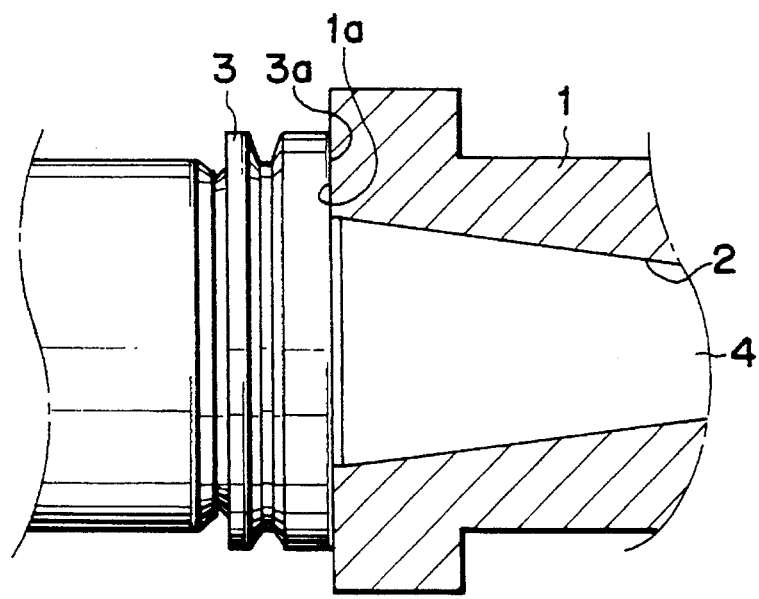
FIG. 7 is an enlarged view showing another example of the tool mounting portion in the conventional spindle apparatus.

FIG. 5 illustrates an example of modification of the embodiment discussed above. In the case of supplying the oil pressure to the fluid passageway 34 of the fixation sleeve 33, it may happen that the fixation sleeve 33 comes off the spindle shaft 1 by the thrust-directional force acting with this pressure oil. For preventing this, a come-off preventive ring-like stopper ST is fastened to the front surface of the front cover 11 with a bolt, wherein the stopper ST has an engagement protrusion 33t, formed on the internal peripheral surface thereof, for engaging with a stepped portion 33d of an outer-diameter surface of a proximal portion of the fixation sleeve 33.

Figure 4:
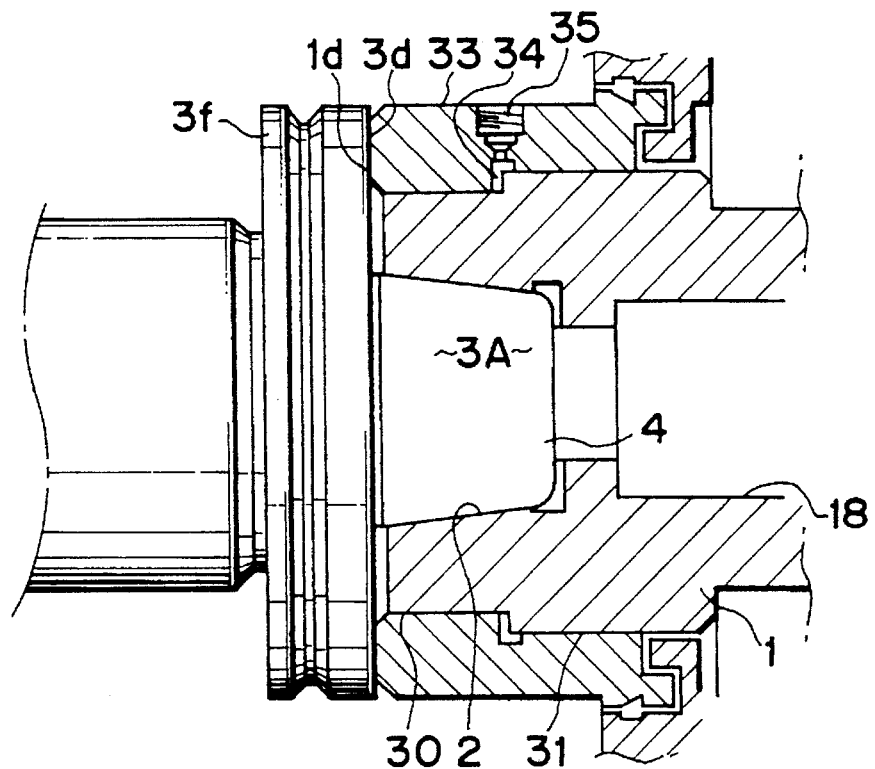
FIG. 4 is an enlarged sectional view showing an example where the present invention is applied to a DIN short taper type tool holder.

Note that the embodiments discussed above have dealt with the BT type tool holder. The present invention is not, however, confined to this holder but is similarly applicable to a DIN short taper type tool holder 3A (see FIG. 4).

Further, the structure of the portion exclusive of the tool holder mounting structure of the front end of the spindle shaft 1 is not also limited to the embodiments, but other known similar structures may be arbitrarily applied.

As discussed above, according to the present invention, the spindle apparatus comprises the spindle shaft having the tool mounting taper hole formed in the shaft end portion and formed with the small-diameter portion and the large-diameter portion in sequence in the external surface of the shaft end portion. The spindle apparatus also comprises the tool holder having the taper shank portion fitted into the taper hole of the spindle shaft and the flange having the larger diameter than the taper shank portion. The spindle apparatus further comprises the sleeve fitted, with the respective interferences, into the small-diameter portion and the large-diameter portion of the spindle shaft and, at the same time, formed with the fluid passageway communicating with the outside at the connecting portion between the small-diameter portion and the large-diameter portion. The fluid pressure is applied to the fluid passageway of the sleeve, and the sleeve is thereby brought into contact with the flange of the tool holder that is fitted to the spindle shaft. Then, the sleeve is fixed to the spindle shaft by removing the fluid pressure, thus supporting the tool holder. With this construction, the following effects are exhibited. The dimensional difference of the gap between the flange of the tool holder mounted to the shaft end of the spindle shaft and the shaft end of the spindle shaft is absorbed, whereby the flange of each of the multiple tool holders is capable of the stable support with the aid of the fixation sleeve. Therefore, the interchangeability of the tool can be extremely ameliorated. Then, the tool holder is supported with the high rigidity of the double-contact structure, thereby making possible the high-load working such as the stable heavy cutting, etc.; and the stable finishing working with a high accuracy can be also carried out.

It is apparent that, in this invention, a wide range of different working modes can be formed based on the invention without deviating from the spirit and scope of the invention. This invention is not restricted by its specific working modes except being limited by the appended claims.

What is claimed is:

1. A spindle apparatus comprising:

a spindle shaft having a tool mounting taper hole formed in a shaft end portion and formed with a small-diameter portion and a large-diameter portion in an outer peripheral surface of the shaft end portion;

a tool holder having a taper shank portion fitted into the taper hole of said spindle shaft and a flange having a larger diameter than the taper shank portion; and a sleeve fitted, with respective interferences, onto the small-diameter portion and the large-diameter portion of said spindle shaft and formed with a fluid passageway communicating with the outside at a connecting portion between the small-diameter portion and the large-diameter portion, wherein a fluid pressure can be applied to the fluid passageway of said sleeve, and said sleeve is thereby brought into contact with the flange of said tool holder, and the sleeve can then be fixed to said spindle shaft by removing the fluid pressure, thus supporting said tool holder in a predetermined position.

2. The spindle apparatus according to claim 1, further comprising holding means for holding said tool holder in the predetermined position, said holding means releasing the tool when operated from outside.

* * * * *